United States Patent [19]

Tzeng et al.

[11] Patent Number: 4,916,463

[45] Date of Patent: Apr. 10, 1990

[54] SUPPORT ROLLERS FOR THE PRINT ROLLER IN A HIGH-ACCURACY, WIDE-PAPER THERMAL PLOTTER

[75] Inventors: Paul S. Tzeng, Fountain Valley; Richard Mansueto, Huntington Beach, both of Calif.

[73] Assignee: Calcomp Inc., Anaheim, Calif.

[21] Appl. No.: 370,033

[22] Filed: Jun. 22, 1989

[51] Int. Cl.$^4$ .............................................. G01D 15/10

[52] U.S. Cl. ................................ 346/76 PH; 400/120

[58] Field of Search ..................... 346/76 PH; 400/120

[56] References Cited

FOREIGN PATENT DOCUMENTS 0134446 11/1978 Japan ............................. 346/76 PH

*Primary Examiner*—Bruce A. Reynolds
*Assistant Examiner*—Huan Tran
*Attorney, Agent, or Firm*—Donald A. Streck; Wm F. Porter, Jr.

[57] ABSTRACT

In a thermal printer for thermally printing on a wide media with a composite printhead comprising a plurality of standard thermal printheads and including a small diameter print roller for supporting the media adjacent the printhead, an improvement to improve print quality by preventing bowing of the print roller away from the printhead. In one embodiment, there is a first cylindrical support roller mounted parallel to the print roller in rolling contact therewith along the length thereof to oppose vertical movement or deformation of the print roller. In another embodiment, there is a second cylindrical support roller mounted parallel to the print roller in rolling contact therewith along the length thereof to oppose movement or deformation of the print roller relative to the printing surface with the first and second support rollers being disposed on opposite sides of a plane passing through the printhead and the print roller whereby the first and second support rollers together prevent bowing of the print roller with respect to the printing surface in both vertical and lateral directions.

2 Claims, 2 Drawing Sheets

SUPPORT ROLLERS FOR THE PRINT ROLLER IN A HIGH-ACCURACY, WIDE-PAPER THERMAL PLOTTER

BACKGROUND OF THE INVENTION

This invention relates to printers and plotters creating an image with a printhead disposed above a print roller and, more particularly, in a thermal printer for thermally printing on a wide media with a composite printhead comprising a plurality of standard thermal printheads intended for printing on a narrow media and having a concave printing surface defining a partial cylindrical space disposed end-to-end and including a print roller for supporting the media adjacent the printing surface and having a cylindrically convex outer surface characterized by a radius sufficiently small so that the print roller congruently fits at least partially within the partial cylindrical space of the concave printing surface, to the improvement to improve print quality by preventing bowing of the print roller away from the printhead comprising a cylindrical support roller mounted parallel to the print roller in rolling contact therewith along the length thereof to oppose movement or deformation of the print roller relative to the printing surface.

A printer or plotter typically feeds a length of paper from a paper roll under a printhead. The printhead prints an image element in any selected location along a line extending (in the "X" direction) across the width of the paper while the paper is transported length-wise (in the "Y" direction) under the printhead. Thus, the exact position in the "X-Y" plane of each image element printed on the paper is determined by the printhead and by the movement of the paper beneath it. The quality of the image is limited by the resolution of the printhead and the accuracy with which the position of the paper relative to the printhead may be determined or controlled. A significant requirement for printing high quality images is that the distance between the paper and the printhead must be uniform across the entire width of the printhead. Otherwise, blurring or density variations occur which materially detract from the resultant image quality. For this reason, the paper is fed from the paper roll beneath the printhead by a print roller, the paper being sandwiched between the print roller and the printhead. Typically the print roller extends across the width of the printhead so that the required uniformity in paper-to-printhead spacing is maintained. The print roller is under mechanical stress arising from the force required to press the paper toward the printhead so as to maintain a uniform paper-to-printhead spacing across the width of the printhead. This stress also includes the force of gravity as the print roller is typically supported on its ends in a horizontal position It is possible for such stress to deform the print roller, causing it to bow in a direction away from the printhead. Such bowing or deformation causes loss of image quality through blurring or poor print resolution in areas of the image where the paper-to-printhead spacing was greater than the rest of the image. This is especially true if a thermal printhead is employed. A thermal printhead consists of tiny thermal elements lying in a thin pixel print line extending across the width of the paper. The thermal elements are individually activated in accordance with the image to be printed. The density and size of the tiny thermal elements define the resolution of the printhead. The resolution of the image printed by the thermal printhead is reduced, however, by diffusion of the heat radiated by an activated thermal element. Such heat diffusion is an unavoidable phenomenon and its deleterious effect on image quality can be minimized only by uniformly maintaining the paper as close as possible to the line of thermal elements in the printhead. In such a device, deformation, bowing or any movement by the print roller must be avoided.

A related problem is that, in some devices, the surface of the thermal printhead facing the paper is, in effect, curved about some radius so as to define a partial cylindrical space or cavity into which the print roller fits. This generally has to do with guiding the paper being fed therethrough past the printhead without catching; however, it has a collateral effect in that the radius of the print roller can be no greater than that which allows the print roller to fit within the partial cylindrical space or cavity defined by the printhead surface. This, in turn, limits the strength of the print roller and its ability to withstand mechanical stress and avoid a slight deformation or bowing. Thus, there is an inherent susceptibility of the printhead to bowing or deformation, making the system as a whole liable to a reduction in image accuracy and quality.

In a typical thermal printer such as that employed in a facsimile machine, the printhead is only about twelve inches wide, as is the print roller, which is short enough so that the print roller will not bow appreciably. Thus, an observable loss in image quality does not occur, particularly if the core of the print roller is made of stiff steel. In graphics plotters and the like, however, it is desirable to employ a printhead on the order of 24 or 36 inches in width. A significant cost savings would be achieved if the printhead comprised a thermal printhead. In fact, one goal of a plotter with which the present invention is used is to provide a low-cost graphics plotter by employing two standard twelve inch thermal printheads in an end-to-end relationship as a single twenty-four inch thermal printhead. Unfortunately, when building such a plotter, it was found that significant bowing of the print roller occurred when the width of the printhead was increased to about twenty-four inches. The print roller's ability to resist bowing or deformation is limited by its radius which, in turn, is limited by the radius of the printhead surface with which the print roller must congruently fit. At a printhead width of twenty-four inches or greater, and for a typical thermal printhead curvature, significant bowing of the print roller in a direction away from the printhead can occur. At a printhead width approaching thirty-six inches (as is a next design objective), corresponding to three twelve inch thermal printhead placed end-to-end, the print roller can not only bow away from the printhead but also bow in a lateral direction with respect to the printhead, further reducing the printed image accuracy and quality.

One solution might be to form the print roller core of ultra-high strength materials. This, or course, would increase the total cost beyond practical limits, and therefore is really no solution at all. There would seem to be no other way to strengthen the print roller to avoid bowing without eliminating the use of a standard printhead with its limiting curved surface to which the print roller presses the paper. Since bowing or deformation of the print roller significantly reduces the accuracy of the image printed on the paper, it would not seem possible to provide a high-accuracy graphics plotter using a thermal printhead without either (a) undesirably restricting the printhead width or (b) eliminating the curvature in the printhead surface by building a special printhead.

All the foregoing can be seen in greater detail with reference to FIG. 1 wherein a thermal printer or plotter according to the prior art includes a pair of yokes **100*a*, 100*b* supporting a rotatable print roller 130 comprising a steel core or axle 133 on which is mounted a paper-gripping rubber sleeve 136. A printhead 140 is stationary above the feed roller 130. Paper (not shown) from a paper roll is sandwiched between the feed roller 130 and the printhead 140. The printhead 140 may be a thermal printhead of the type well-known in the art, containing a plurality of small thermal elements (not shown) facing the feed roller 130 and lying in a thin pixel print line across the width W of the printhead 140. As the feed roller 130 rotates about its cylindrical axis, it maintains the paper in smooth contact with the thin line of thermal elements in the printhead 140 while pulling the paper across the printhead 140**.

A significant problem with the printer of FIG. 1 is that the feed roller 130 must span the width W and therefore tends to bow (as indicated in dashed line) away from the printhead 140 under the stress of the paper, particularly as the width W approaches about twenty-four inches or greater. As illustrated, such bowing by the feed roller 130 permits the middle portion of the paper held between the feed roller 130 and the printhead 140 to sag away from the printhead 140. This causes the image recorded on the paper by the printhead 140 to be blurred or distorted in the middle portion of the paper, a significant problem.

The ability of the feed roller 130 to resist such bowing is determined by the radius r of the steel core or axle 133. On solution to this problem might be to increase the radius r, thereby increasing the outer radius R of the feed roller 130. However, such a solution is not practical, in light of the following. The cross-sectional view of FIG. 3 shows a feed roller 230 (identical to the feed roller 130 of FIG. 1) having a steel core or axle 233 and a paper-gripping rubber sleeve 236. A printhead 240 (identical to the printhead 140 of FIG. 1) has a curved printing surface **240*a* defining a partial cylindrical space or cavity within which the feed roller 230 must closely nest in the manner illustrated in order to most effectively hold the paper against the entire printing surface 240*a* for highest quality printing. This restricts the radius R of the feed roller 230 so as not to substantially exceed the radius of the curved printing surface 240*a*. Thus, without reducing or eliminating the rubber sleeve 236, the radius r of the axle 233 (identical to the core or axle 133 of FIG. 1) may not be increased significantly beyond that shown in FIG. 3. Therefore, referring again to FIG. 1, there is an inherent limitation in the stiffness of the feed roller 130 because it is the steel axle 133 which provides the resistance to bowing by the feed roller 130**.

In summary, the problem is how to provide a low-cost high-accuracy graphics plotter with a relatively wide printhead having a curved surface with which the print roller congruently fits while at the same time not losing print quality across the width of the plot due to print roller sag.

Accordingly, it is an object of the invention to provide a low-cost high-accuracy printing apparatus such as a graphics plotter or the like employing a wide thermal printhead composed of adjacent end-to-end standard shorter length printheads with a curved printing surface with which the print roller congruently fits wherein the print roller does not bow or deform away from the printhead despite its radius being limited by the curvature of the printhead surface.

It is another object of the invention to provide a low-cost high-accuracy graphics plotter having a wide thermal printhead with a curved printing surface with which the print roller congruently fits wherein the print roller does not bow or deform despite its radius being limited by the curvature of the printhead surface without requiring the use of exotic or expensive materials.

It is still another object of the invention to provide a low-cost high-accuracy graphics plotter having a wide thermal printhead with a curved printing surface with which the print roller congruently fits in which the print roller is independently supported so as to prevent its deformation or bowing in a direction away from the printhead.

It is a still further object of the invention to provide a low-cost high-accuracy graphics plotter having a wide thermal printhead with a curved printing surface with which the print roller congruently fits in which the print roller is independently supported so as to prevent its deformation or bowing in a direction away from the printhead and so as to prevent its deformation or bowing laterally with respect to the printhead.

It is yet another object of the invention to provide a low-cost high-accuracy graphics plotter having a printhead and a print roller, in which the print roller is independently supported so as to ensure that images recorded by the printhead are characterized by a high accuracy and high quality.

Other objects and benefits of the invention will become apparent from the description which follows when taken in conjunction with the drawing figures which accompany it.

SUMMARY OF THE INVENTION

The foregoing objects have been achieved in apparatus such as a printer, plotter, or the like which prints on a media with a printhead disposed transversely across and above the media and wherein the media is supported from below by a media support supported on ends thereof parallel to the printhead for holding the media close adjacent and equally spaced from the printhead across the width of the media, by the improvement of the present invention for preventing uneven spacing between the media support and the printhead from bowing of the media support comprising, a support member disposed to vertically support the media support in a center portion so as to oppose bowing by the media support.

In one embodiment, the media support is a cylindrical roller having a radius, r, determined by a concave surface of the printhead which mates with the media support and is mounted for rotation on ends thereof; and, the support member is a cylindrical roller having a radius, R, which is greater than r mounted for rotation on ends thereof, the cylindrical roller comprising the support member being disposed in parallel rolling contacting relationship with the media support along the length thereof to roll in combination therewith, the cylindrical roller comprising the support member being disposed in a plane passing through the printhead and the media support. The cylindrical roller comprising the support member is characterized by a radius which renders it stiff enough to prevent the roller comprising the media support from bowing.

In another embodiment intended for even wider printheads, the media support is a cylindrical roller having a radius, r, determined by a concave surface of the printhead which mates with the media support and is mounted for rotation on ends thereof; and, the support member comprises a pair of cylindrical rollers having radii, R1 and R2, which are greater than r mounted for rotation on ends thereof, the support rollers comprising the support member being disposed in parallel rolling contacting relationship with the media support along the length thereof to roll in combination therewith, the support rollers comprising the support member being disposed on opposite sides of a plane passing through the printhead and the media support whereby the media support is supported against both vertical and lateral bowing. The cylindrical rollers comprising the support member are characterized by having respective radii which render them stiff enough to prevent the roller comprising the media support from bowing both vertically and laterally.

DESCRIPTION OF THE PREFERRED EMBODIMENT

Figure 1:
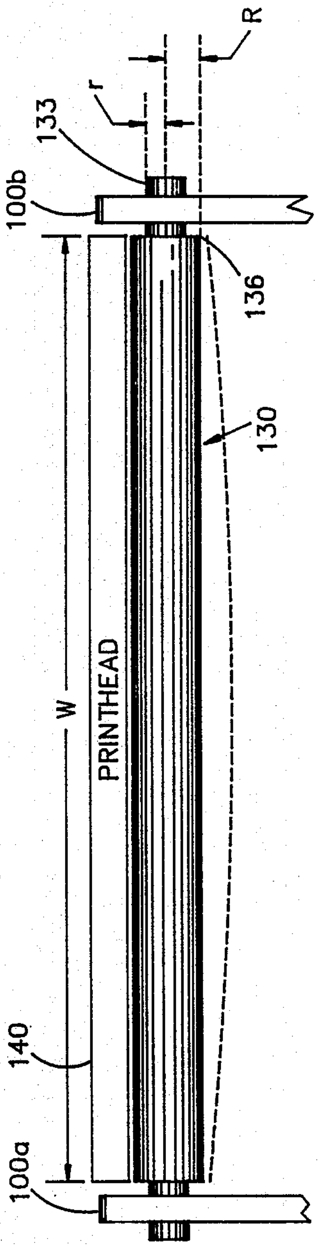
FIG. 1 PRIOR ART
FIG. 1 is a simplified front view of a thermal printer according to the prior art showing the print roller disposed under the printhead in an unsupported manner.
Figure 2:
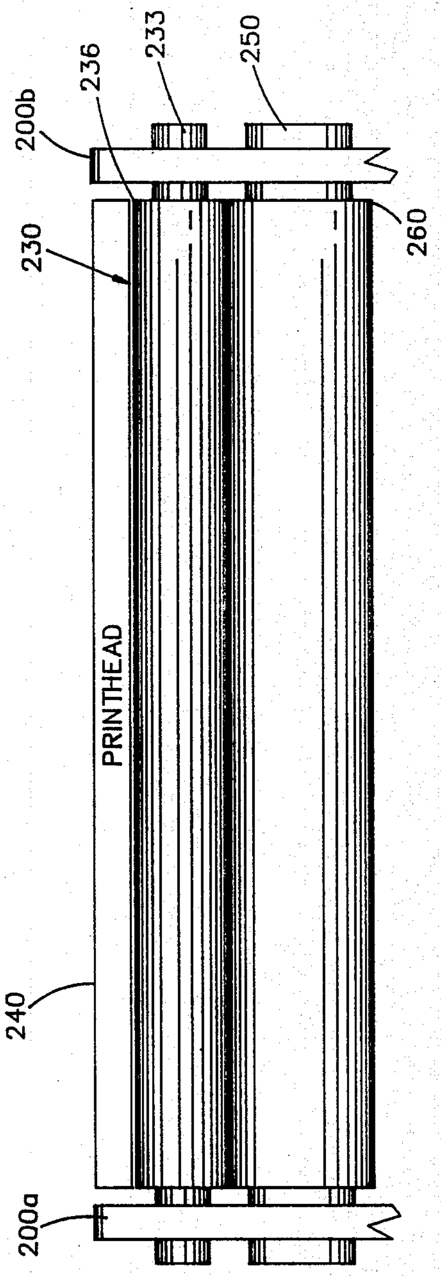
FIG. 2 is a simplified front view of a thermal printer according to this invention showing the print roller disposed under the printhead in a supported manner.

A preferred embodiment of the invention is illustrated in FIG. 2 and includes a pair of yokes 200a, 200b, the feed roller 230 and the printhead 240. In addition, this embodiment includes a stationary rotatable axle 250 supported in the yokes 200a, 200b and a stiff support roller 260 mounted on the axle 250. The support roller 260 is parallel to the feed roller 230. The circumferential surface of the support roller 260 supportingly contacts the circumferential surface of the feed roller 230. The support roller 260 rotates with the feed roller 230 as paper is fed beneath the printhead 240. The support roller 260 and its axle 250 preferably are formed of strong steel. Referring once again to FIG. 3, the pixel print line 240b of the printhead 240 and the cylindrical axes (not indicted) of the support roller 260 and of the feed roller 230 are in mutual alignment along an imaginary straight line.

Figure 3:
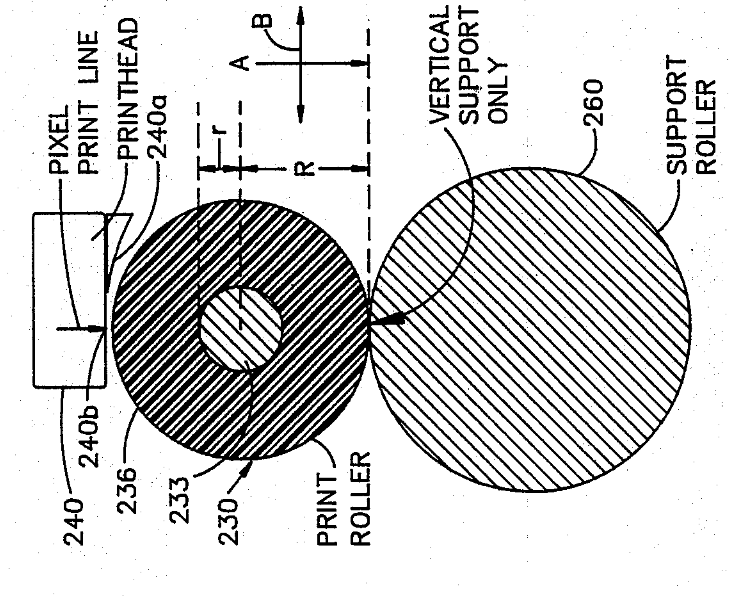
FIG. 3 is a cross-sectional side view corresponding to FIG. 2.

The embodiment of FIG. 3 prevents bowing or deformation by the feed roller 230 in a direction A away from the printhead 240. Significantly, the radius of the support roller 260 is not restricted (as is the radius of the feed roller 230) and is therefore preferably larger than that of the feed roller 230 to provide sufficient stiffness to prevent the feed roller 230 and its steel axle 233 from bowing. This generally suffices to ensure a high printing accuracy and qualify for a printhead width W of about twenty-four inches.

Figure 4:
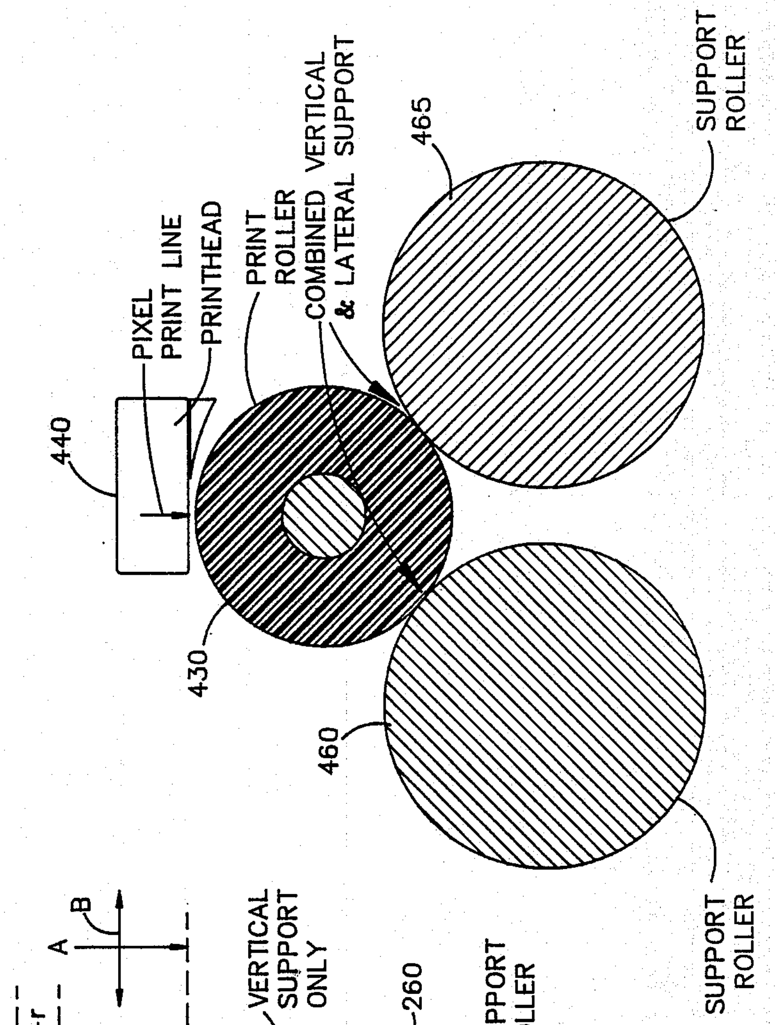
FIG. 4 is a cross-sectional side view of another embodiment of the invention wherein two support rollers provide both vertical and lateral support.

For a printhead width W of larger width (e.g. approaching thirty-six inches, it is anticipated to be necessary to prevent bowing by the feed roller 230 and its axle 233 not only in the direction A away from the printhead 240 but also in a lateral direction B. This is accomplished in an alternate embodiment of the invention as illustrated in FIG. 4. As depicted therein, the circumferential surface of a cylindrical feed roller 430 (corresponding to the feed roller 230 of FIG. 3) is supportingly contacted by the circumferential surfaces of a part of laterally displaced steel support rollers 460 and 465. The support rollers 460 and 465 are each parallel to the feed roller 430. The structure of each of the support rollers 460, 465 corresponds to that of the single support roller 260 of FIG. 3. The pair of support rollers 460 and 465 provide combined vertical (direction A) and lateral (direction B) support to the feed roller 430 to prevent bowing by the feed roller 430 in either direction A or direction B. The support rollers 460 and 465 rotate with feed roller 430 in the same manner as the support roller 260 rotates with the feed roller 230 in the embodiment of FIG. 3. For this purpose, the support rollers 460 and 465 are not in mutual contact in the example illustrated in FIG. 4. Preferably, the cylindrical axes (not shown) of the two support rollers 460 and 465 are located equilaterally with respect to the pixel print line 440b of printhead 440. In the preferred embodiment, the radius of each of the support rollers 460 and 465 is significantly greater then the radius of the feed roller 430 so that the support rollers 460 and 465 are sufficiently strong to prevent both vertical and lateral bowing or deformation by the feed roller 430.

Other variations and modifications may be made to the invention. For example, in the embodiment of FIG. 4, the two support rollers 460 and 465 need not be located equilaterally with respect to the pixel print line 440b. Furthermore, the two support rollers need not be of the same radius. Also, more than two support rollers may be provided in supportive contact with the feed roller 430. Further, the size of each support roller relative to the size of the feed roller may be different from that illustrated in FIG. 3 or FIG. 4.

Wherefore, having thus described the invention, what is claimed is:

1. In a printing apparatus which records on media and includes a printhead having a concave printing surface defining a partial cylindrical space and a print roller having a cylindrically convex outer surface characterized by a radius sufficiently small so that the print roller congruently fits at least partially within the partial cylindrical space of the concave printing surface, the improvement to improve print quality by preventing bowing of the print roller away from the printhead in such printing apparatus when configured for printing on a wide media comprising:

(a) a first cylindrical support roller mounted for rotation parallel to the print roller and in rolling contact therewith along the length thereof so as to oppose movement or deformation of the print roller relative to the printing surface, said first cylindrical having a radius larger than that of the print roller such that said first cylindrical support roller is stiff enough to prevent the print roller from bowing; and, (b) a second cylindrical support roller having a radius larger than that of the print roller such that said first cylindrical support roller is stiff enough to prevent the print roller from bowing mounted for rotation parallel to the print roller and in rolling contact therewith wherein said first and second support rollers contact the print roller at respective first and second locations along the circumference of the print roller so that said first and second support rollers together prevent bowing of the print roller with respect to the printing surface in two mutually orthogonal directions.

2. In a thermal printer for thermally printing on a wide media with a composite printhead comprising a plurality of standard thermal printheads intended for printing on a narrow media and having a concave printing surface defining a partial cylindrical space disposed end-to-end and including a print roller for supporting the media adjacent the printing surface and having a cylindrically convex outer surface characterized by a radius sufficiently small so that the print roller congruently fits at least partially within the partial cylindrical space of the concave printing surface, the improvement to improve print quality by preventing bowing of the print roller away from the printhead in two mutually orthogonal directions comprising:

(a) a first cylindrical support roller mounted parallel to the print roller in rolling contact therewith along the length thereof to oppose movement or deformation of the print roller relative to the printing surface; and, (b) a second cylindrical support roller mounted parallel to said print roller in rolling contact therewith along the length thereof to oppose movement or deformation of the print roller relative to the printing surface, said first and second support rollers being disposed on opposite sides of a plane passing through the printhead and the print roller whereby said first and second support rollers contact the print roller at respective first and second locations along the circumference of the print roller so that said first and second support rollers together prevent bowing of the print roller with respect to the printing surface in two mutually orthogonal directions, said first and second support rollers having radii larger than the radius of the print roller and sufficiently large so as to render said first and second support rollers in combination stiff enough to prevent the print roller from bowing.

* * * * *